United States Patent
Henry et al.

(10) Patent No.: US 7,815,232 B2
(45) Date of Patent: Oct. 19, 2010

(54) DOOR CLOSURE ASSIST ASSEMBLIES

(75) Inventors: Christopher P. Henry, Newbury Park, CA (US); William Barvosa-Carter, Ventura, CA (US); Alan L. Browne, Grosse Pointe, MI (US); Cameron Massey, Hawthorne, CA (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 678 days.

(21) Appl. No.: 11/077,498

(22) Filed: Mar. 9, 2005

(65) Prior Publication Data

US 2005/0198774 A1    Sep. 15, 2005

Related U.S. Application Data

(60) Provisional application No. 60/552,781, filed on Mar. 12, 2004.

(51) Int. Cl.
E05C 17/56 (2006.01)
E05C 19/16 (2006.01)

(52) U.S. Cl. .............................. 292/251.5; 292/DIG. 65

(58) Field of Classification Search .............. 292/251.5, 292/DIG. 65
See application file for complete search history.

(56) References Cited

U.S. PATENT DOCUMENTS

| | | | | |
|---|---|---|---|---|
| 3,055,193 A | * | 9/1962 | Smith | 62/440 |
| 3,260,788 A | * | 7/1966 | Stetson | 174/374 |
| 3,869,873 A | * | 3/1975 | Thomas | 62/275 |
| 4,073,521 A | * | 2/1978 | Mena | 292/256.65 |
| 4,399,317 A | * | 8/1983 | Van Dyk, Jr. | 174/364 |
| 4,761,917 A | | 8/1988 | Knecht et al. | |
| 4,805,347 A | | 2/1989 | Smith | |
| 4,806,815 A | * | 2/1989 | Honma | 310/307 |
| 4,956,625 A | | 9/1990 | Cardone et al. | |
| 5,046,285 A | | 9/1991 | Fratini, Jr. et al. | |
| 5,668,744 A | | 9/1997 | Varadan et al. | |
| 5,771,742 A | * | 6/1998 | Bokaie et al. | 74/2 |
| 6,008,992 A | * | 12/1999 | Kawakami | 361/726 |
| 6,009,699 A | | 1/2000 | Delvael | |
| 6,098,992 A | * | 8/2000 | Long et al. | 277/637 |
| 6,176,934 B1 | | 1/2001 | Nelson | |
| 6,260,892 B1 | * | 7/2001 | Chang | 292/251.5 |
| 6,310,411 B1 | * | 10/2001 | Viallet | 307/125 |
| 6,393,765 B1 | | 5/2002 | Goldstein et al. | |

(Continued)

FOREIGN PATENT DOCUMENTS

GB    49580    * 4/1982

OTHER PUBLICATIONS

"Silicone-Rubber Microvalves Actuated by Paraffin" NASA Tech Briefs, Sep. 2004, pp. 56, 58.

(Continued)

*Primary Examiner*—Carlos Lugo (57) ABSTRACT

Door closure assist assemblies that assist in providing a final closing motion generally includes an extender portion comprised of an active material adapted to linearly expand in response to an activation signal and a releasable fastener having one component in movable communication with the extender portion and a second component attached to the other selected one of the door and doorframe. During operation, the door closure assist assembly provides the final closing action.

10 Claims, 4 Drawing Sheets

U.S. PATENT DOCUMENTS

| | | | |
|---|---|---|---|
| 6,485,029 B1 | 11/2002 | Moody et al. | |
| 6,489,871 B1 | 12/2002 | Barton | |
| 6,615,545 B2 | 9/2003 | Rogers, Jr. et al. | |
| 6,702,301 B1 * | 3/2004 | Davies et al. | 277/646 |
| 6,871,519 B2 * | 3/2005 | Butera et al. | 70/256 |
| 6,902,214 B2 * | 6/2005 | Smith | 292/251.5 |
| 7,003,993 B1 * | 2/2006 | Zehrung | 70/278.7 |
| 7,165,792 B2 * | 1/2007 | Queveau et al. | 292/251.5 |
| 7,258,347 B2 * | 8/2007 | Keefe et al. | 277/628 |
| 2002/0113380 A1 | 8/2002 | Clark | |
| 2002/0152688 A1 | 10/2002 | Dron | |
| 2004/0008853 A1 | 1/2004 | Pelrine et al. | |
| 2004/0253566 A1 | 12/2004 | Quinn et al. | |
| 2005/0206096 A1 * | 9/2005 | Browne et al. | 277/628 |
| 2005/0212304 A1 * | 9/2005 | Herrera et al. | 292/251.5 |
| 2005/0230925 A1 * | 10/2005 | Browne et al. | 277/919 |
| 2006/0012191 A1 * | 1/2006 | Brei et al. | 292/341.17 |
| 2006/0125188 A1 * | 6/2006 | Verbrugge et al. | 277/319 |

OTHER PUBLICATIONS

"Dielectric Elastomer Actuators in the Development of a 'Mechatronic Muscle'", Ailish O'Halloran et al., Department of Electronic Engineering, NUI, Galway Faculty of Engineering Research Day 2004 (3 pgs).

\* cited by examiner

ACTIVATION
Fig. 5

DEACTIVATION
Fig. 6

DOOR CLOSURE ASSIST ASSEMBLIES

CROSS REFERENCE TO RELATED APPLICATIONS

The present application relates to and claims priority to U.S. Provisional Application No. 60/552,781 entitled "Active Seal Assemblies" and filed on Mar. 12, 2004, the disclosure of which is incorporated by reference herein in their entirety.

BACKGROUND

This disclosure generally relates to door closure assist assemblies, and more particularly, to door closure assist assemblies that provide a final closing motion once the door is put into a closed position.

Current door closure assist assemblies rely on bulky and complicated mechanisms. There are no known assemblies that employ active materials.

Accordingly, it is desirable to have door closure assist assemblies that employ active materials that can be activated to provide a final closing action once the door is put into a closed position.

BRIEF SUMMARY

Disclosed herein are door closure assist assemblies and methods for assisting a final closing motion of a door within a doorframe. In one embodiment, the door closure assist assembly comprises an extender portion having one end fixedly attached to a selected one of a door and a doorframe, wherein the extender portion comprises an active material operative to change at least one attribute in response to an activation signal, wherein the extender portion is adapted to linearly expand with a change in the at least one attribute of the active material; a releasable fastener disposed in operative communication with the extender portion; an activation device in operative communication with the active material; and a controller in operative communication with the activation device.

A method for assisting a final closing motion of a door within a doorframe comprises moving the door to within a defined distance from the doorframe; activating a door closure assist assembly, wherein the door closure assist assembly comprises an extender portion having one end fixedly attached to a selected one of a door and a doorframe, wherein the extender portion comprises an active material operative to change at least one attribute in response to an activation signal, a releasable fastener having one component attached to the extender portion and a second component attached to the other selected one of the door and the doorframe, wherein activating the door closure assist assembly comprises extending the extender portion, and fastening the one component to the second component; and deactivating the door closure assist assembly and retracting the extender portion to provide the final closing motion.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein are door closure assist assemblies and methods of use, wherein the door closure assist assemblies can be activated and/or controlled remotely to provide final door closure. For automotive door applications, the door closure assist assemblies can be programmed to provide minimal door closing efforts in addition to providing the final closing action once the door is put into a closed position so as to provide increased seal effectiveness. The final closing action of the door closure assist assembly overcomes the compressive forces of any passive seals peripherally disposed about and between the door and door frame as well as maximizes seal effectiveness so as to advantageously reduce noise transmission, leaking of water, entry of air pollution, and the like, through the interface provided by the seal.

Although reference will be made herein to automotive applications, it is contemplated that the door closure assist assemblies can be employed for various non-automotive interfaces such as refrigerator doors, cabinets, drawers, and the like. Moreover, by use of the term door, it is not meant to be limited in scope and can include trunk lids, entry doors, compartment doors, hood doors, and the like.

The door closure assist assemblies generally comprise an extender portion formed of an active material and a releasable fastener disposed on an end of the extender portion, an activation device in operative communication with the active material to selectively provide linear extension of the releasable fastener, and a controller in operative communication with the activation device for providing the activation signal to the active material. In some embodiments, the extender portion is disposed within a seal body, wherein the releasable fastener portion is either internally and/or externally attached to the seal body and is in operative communication with the extender portion. As will be described in greater detail below, the active material can comprise a shape memory material, wherein the shape and/or modulus properties of the shape memory material can be selectively varied by means of the applied activation signal. Suitable shape memory materials include, but are not intended to be limited to, shape memory alloys (SMA), shape memory polymers (SMP), electroactive polymers (EAP), ferromagnetic SMAs, electrorheological fluids (ER), magnetorheological fluids (MR), dielectric elastomers, ionic polymer metal composites (IPMC), piezoelectric polymers, piezoelectric ceramics, various combinations of the foregoing materials, and the like.

As noted above, the door closure assist assemblies generally include an extender portion and a releasable fastener attached thereto. The extender portion includes the active material, e.g., shape memory materials, which is adapted to provide linear extension of the releasable fastener. For example, a linear actuator formed of a uni-morphic or a bi-morphic piezoelectric material can be utilized or an inflator formed of an electroactive polymer or a dielectric elastomer can be used as will be described herein. The extender portion is not intended to be limited to any particular form or active material. Moreover, it is contemplated that for any of the embodiments disclosed herein, the active material extender portion can be further attached to a linear motion amplifier such as a scissored or pivoted truss assembly, a screw or arm, a telescoping or nested structure, and the like to expand the amount of linear extension. Still further, the various extender portions described herein can be used in parallel, or alternatively, may be utilized in a stacked arrangement.

The releasable fastener is generally adapted to transmit a variable force that can be released as desired. The variable force of the releasable fastener is selected to overcome any forces that may be needed to effect the final closing action of the door. For example, the variable force can be selected to overcome the compressive forces normally associated with any passive seals (e.g., weather stripping) peripherally disposed between the door and doorframe. Moreover, since the releasable fastener is to be employed with vehicle doors, it is desirable that the releasable fasteners have a repeatable and reversible fastening mechanism. For similar reasons, the extender portion should be adapted to undergo numerous cycles. By way of example, the releasable fastener can comprise materials that form a magnetic circuit and/or materials adapted to provide an electrostatic force, wherein the magnetic force and/or electrostatic force can be selectively activated and/or manipulated. Alternatively, a releasable fastener that utilizes shape memory materials can be used.

Figure 1:
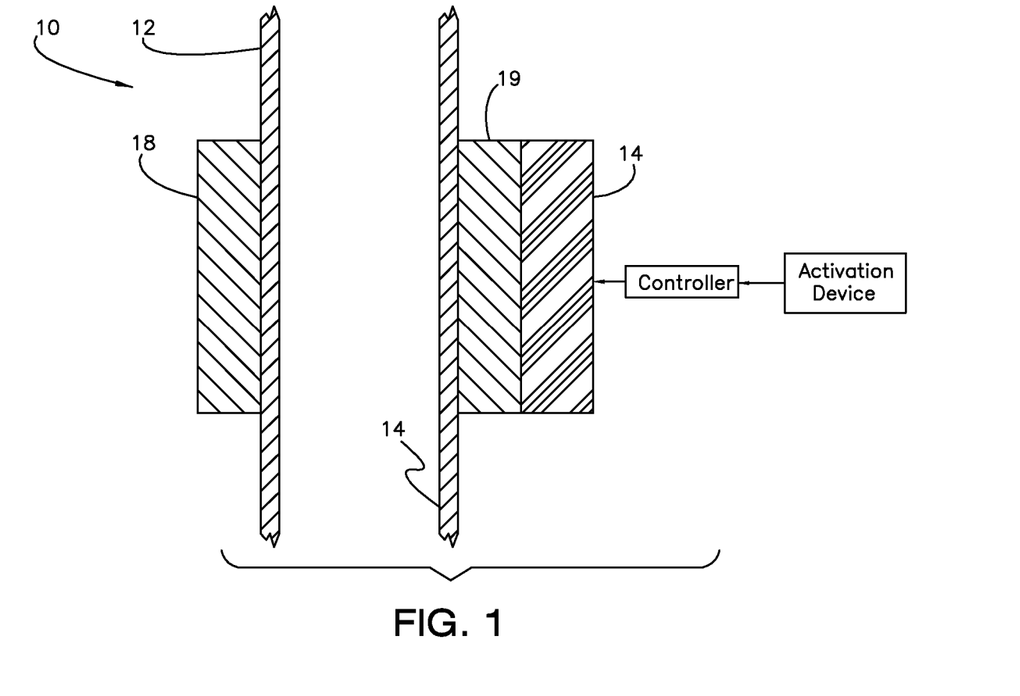
FIG. 1 illustrates a partial cross-sectional view of a door closure assist assembly in accordance with one embodiment.
Figure 5:
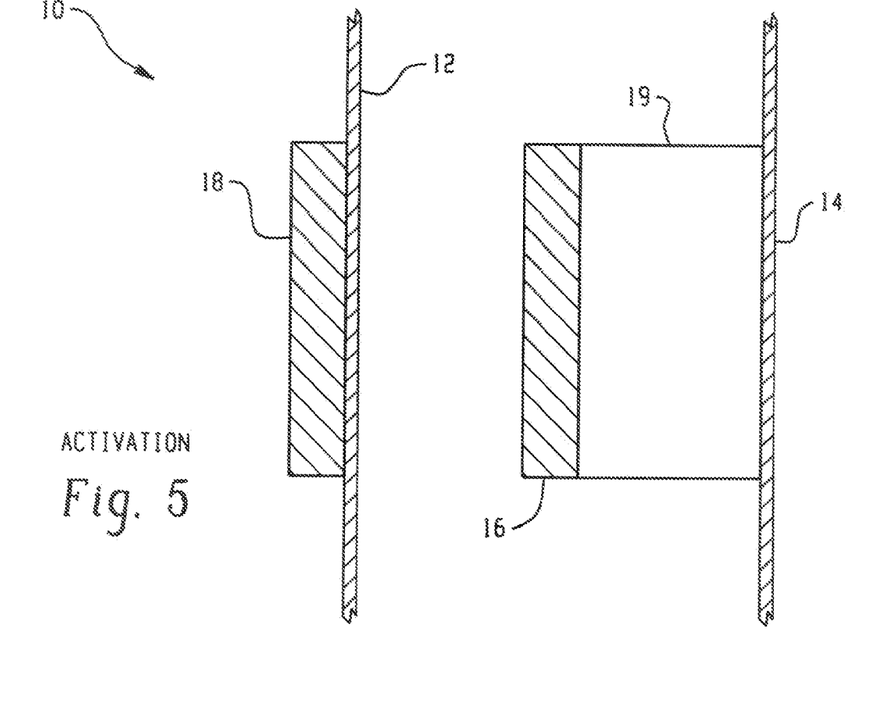
FIGS. 5 and 6 illustrate a partial cross-sectional view of a door closure assist assembly upon activation and deactivation.
Figure 6:
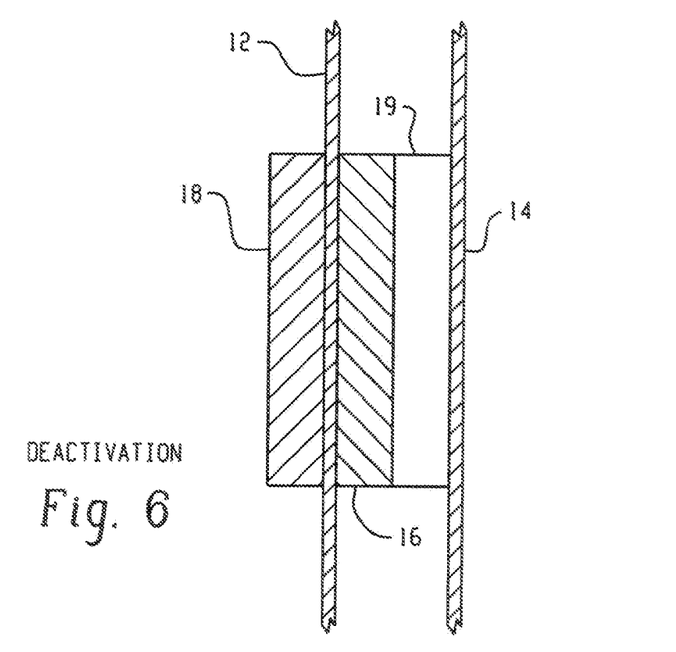

Turning now to FIG. 1, there is shown a partial sectional view of a vehicle door 12 and vehicle frame 14 (i,e., doorframe) that utilizes a magnetic door closure assist assembly 10. In this embodiment, a magnetic field is selectively generated between the door 12 and vehicle frame 14 to provide the final closing action of the door against the vehicle frame 14. Upon initial closing of the door to a defined distance from the doorframe 14, a magnetic field can be generated to provide a cinching action of the door against the doorframe, i.e., provides the final closing action. The magnetic door closure assist assembly 10 generally includes an extender portion 19 and a magnetic field generator 16. In the other one of the door 12 and the vehicle frame 14, there is disposed a ferrous (ferromagnetic) material 18, which is in contact alignment with the magnetic field generator 16, i.e., the releasable fastener. Suitable magnetic field generators include, without limitation, a permanent magnet or an electromagnet, e.g., a solenoid. In the case of an electromagnet, when the door 12 is sufficiently close to the frame 14 as determined by a proximity sensor or the like (not shown) e.g., a capacitive sensor, the electromagnet can be activated to provide a magnetic field resulting in an attractive force with the ferrous material 18. With a sufficiently strong magnetic force (via either a high field strength or over a large area), the door 12 will swing a fraction of the gap between the door 12 and frame 14 so as to provide final door closure. As such, the magnetic force is inversely proportional to the width of the gap. Magnetic force may be improved by use of highly permeable external surfaces between the magnetic field generator and the air gap. FIG. 5 illustrates activation of the extender portion, which brings the magnetic field generator in close proximity to the ferrous material in the door 12 and causes magnetic attraction of the door 12 to the doorframe 14, FIG. 6 illustrates final closure upon deactivation of the extender portion 19.

Figure 7:
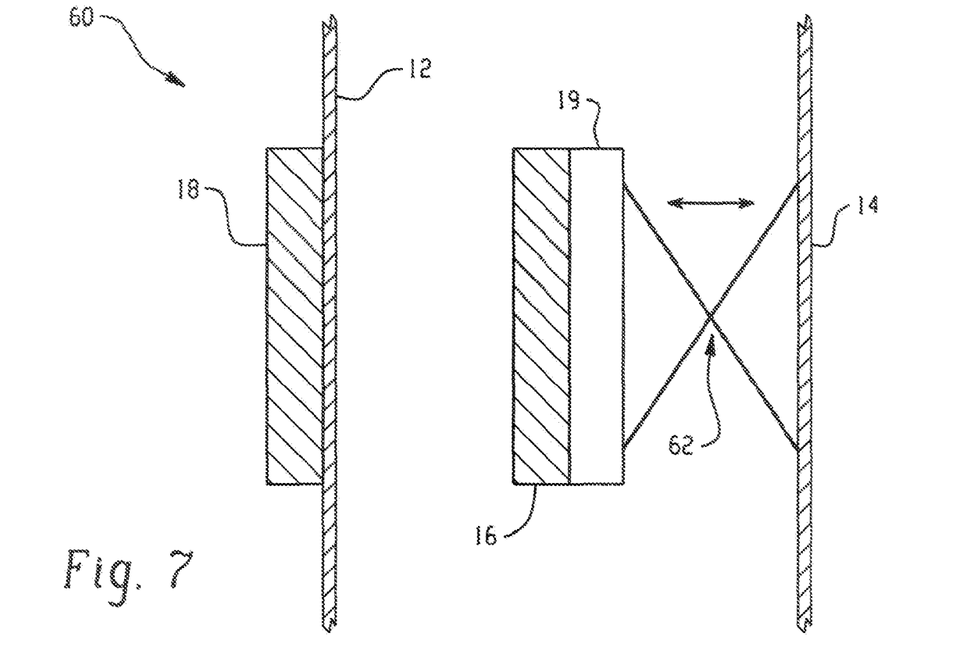
FIG. 7 illustrates a partial cross-sectional view of a door closure assist assembly in accordance with one embodiment.

The extender portion 19 includes an active material adapted to selectively expand upon activation with a suitable activation signal. In this manner, upon activation of the active material, the extender portion extends the releasable fastener towards the door or doorframe depending on which surface the extender portion is disposed therein, By way of example, the extender portion may comprise an active seal such that the dimension of the seal can he actively adjusted with an active material, e.g., a shape memory material. For example, the extender portion can comprise an electroactive polymer that swells upon application of a suitable electrical signal, Upon discontinuation of the activation signal, the extender portion reverts to its original dimension. Likewise, the extender portion 19 can comprise a piezoelectric material that displaces the releasable fhstener upon application of a suitable electrical signal. Other embodiments include the use of shape memory alloys or polymers that undergo a dimensional change upon thermal activation, for example. Still other embodiments include the use of magnetorheological elastomers that undergo a change in shape orientation in response to a magnetic signal so as to extend the releasable fastener, Optionally, these embodiments can further includes linear motion amplifier as previously discussed. Using the magnetic door closure assist assembly as an exemplary embodiment, the assembly 60 as shown in FIG. 7 includes a scissored truss as the linear motion amplifier 62, The linear motion amplifier 62 is intermediate the extender portion and a selected one of the door 12 and door frame 14. In this manner the amount of linear expansion is increased.

Figure 8:
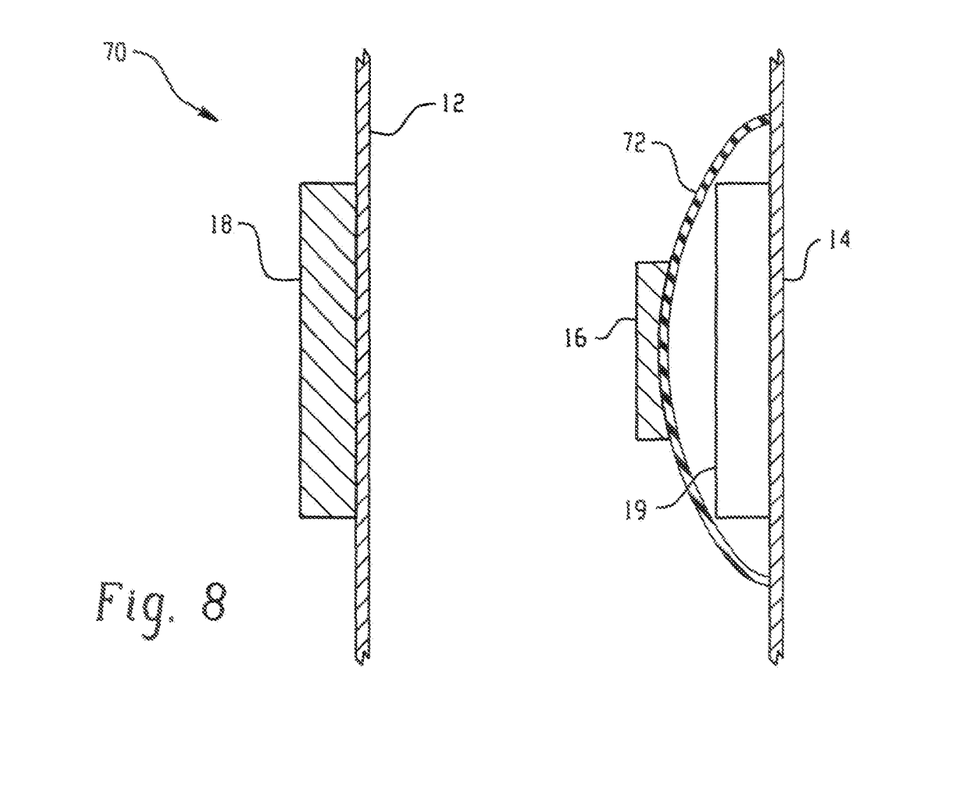
FIG. 8 illustrates a partial cross-sectional view of a door closure assist assembly in accordance with one embodiment.

Optionally, the door closure assist assembly 10 can be disposed within a seal body as shown in FIG. 8. The door closure assist assembly 70 includes encapsulates the extender portion 19 within a seal body 72 such that expansion of the extender portion 19 expands the seal body 72. One component of a releasable fastener 16 is disposed on the seal body and is alignment with a second component 18 disposed on the opposing door 12 or door frame 14,depending on which surface the extender portion is disposed. The magnetic door closure assist assembly can be integrated within the door or doorframe as previously shown, or alternatively may be disposed on an exterior surface of the door or doorframe, For the specific use in automotive applications, a plurality of magnetic door closure assist assemblies can be disposed about a periphery of a vehicle door and/or doorframe, In this manner, the magnetic field can be sequentially applied as the door 12 closes about the periphery of the frame 14. Optionally, a single magnetic door closure assist is employed. In any of the embodiments disclosed herein, a latch may he further included to maintain the door in the final closed position and permit deactivation of the active material in the door closure assist, thereby conserving power, if desired.

Figure 2:
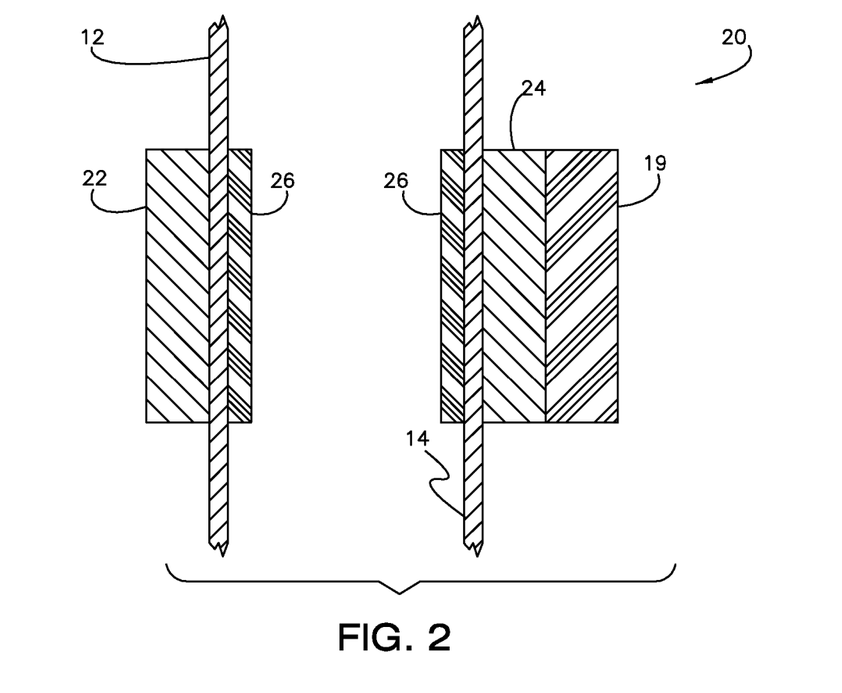
FIG. 2 illustrates a partial cross-sectional view of a door closure assist assembly in accordance with another embodiment.

FIG. 2 illustrates an electrostatic door closure assist assembly 20. In this embodiment, an air gap capacitor is formed such that an electric field can be selectively generated within a relatively small gap as defined by initial closure of the door 12 against the doorframe 14. The electrostatic door closure assist assembly 20 includes electrodes 22, 24 disposed in an opposing relationship on the door 12 and doorframe 14, wherein each electrode 22, 24 is in operative communication with a power source (not shown). When the door 12 is in close proximity to the frame 14, i.e., a small gap is formed there between, as detected by a proximity sensor or the like (not shown), a high voltage is applied to the electrodes 22, 24 creating an electrostatic force with the opposing electrode 24. With a sufficiently strong electrostatic force via either high field strength or a plurality of air gap capacitors, the compressive forces normally associated with door closing can be overcome to provide final door closure of the door against the doorframe. The final door closure occurs as a result of the electrostatic charge magnitude. If field exposure or physical interface is a concern, the electrodes 22, 24 can be coated or covered with flaps and/or barriers 26. One or both of the electrodes 22, 24 can be in operative communication with the extender portion 19 as previously discussed. In this manner, the gap provided upon initial door closing can be increased while maintaining an effective gap between the electrodes such that the electrostatic force can be applied to effect final door closure.

Figure 3:
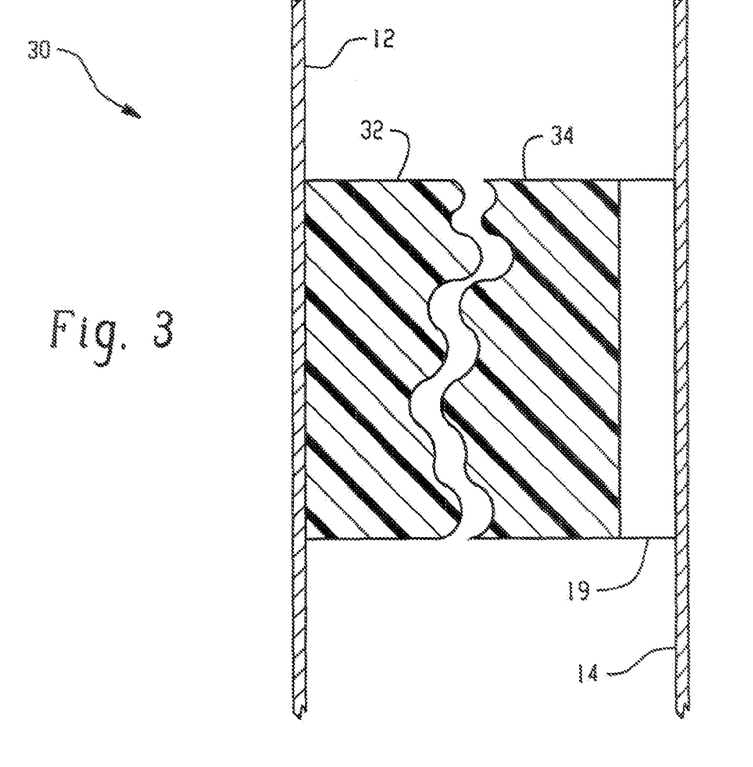
FIG. 3 illustrates a partial cross-sectional view of a door closure assist assembly in accordance with another embodiment.

FIG. 3 illustrates a door closure assist assembly 30 employing a releasable fastener comprising a reversible adhesive 32, 34 disposed on the doorframe and door that is activated by heat or light, for example. Upon activation of the reversible adhesive 32, 34 and extender portion 19 during door closure, the door adheres to the doorframe to permit final door closure to occur. Upon contraction of the extender portion, the door is cinched against the doorframe, and final door closure occurs.

Hot-melt thermoplastics such as ethylene-vinylacetate (EVA) copolymer emulsions are a couple of examples of suitable heat reversible adhesives. Other suitable adhesives include styrene block copolymers such as styrene-isoprene-styrene block copolymers (SIS), styrene butadiene styrene block copolymers (SBS), and the like. Still other heat activated adhesives include, but are not intended to be limited to, ethylene vinyl acetate, ethylene ethyl acrylate (EEA), and amorphous polypropylene base polymers. In addition, UV curable removable adhesives can also be used in the present disclosure. Other adhesives include those adhesives that can switch from "sticky" to "not-sticky" with just a slight temperature change. These types of adhesives are generally a combination of two types of polymer molecules; both polymers having long carbon backbones with side groups. The side groups of one molecule may contain hydrogen atoms while the polymer contains side groups that contain mostly fluorine atoms. At room temperature, the two molecules organize themselves into neat, alternating layers to form a hard material. Raising the temperature to 35° C., for example, can melt the polymer. The change is very sudden (within 2° C.) whereas, conventional adhesives lose their tackiness only if they are cooled by about −40° C. The temperature can be controlled at which the transition occurs by either altering the ratio of polymers in the adhesive or controlling the composition and length of the side changes.

In addition to the different types of adhesive described above, a removable structural epoxy adhesive that reacts to temperature change can also be used. This approach relies on the use of a reversible chemistry that breaks apart the adhesive at elevated temperatures resulting in a low adhesive molecular weight and low bond strength. Diels-Alder bonds, which are common chemical linkages that break at high temperatures are built into the epoxy material. The bond in this adhesive can break at 90-130° C. depending on the formulation. Minimal force is then required to separate the substrates. The adhesive rebonds between 20 and 60° C. Other suitable adhesives will be apparent to those skilled in the art in view of this disclosure.

Figure 4:
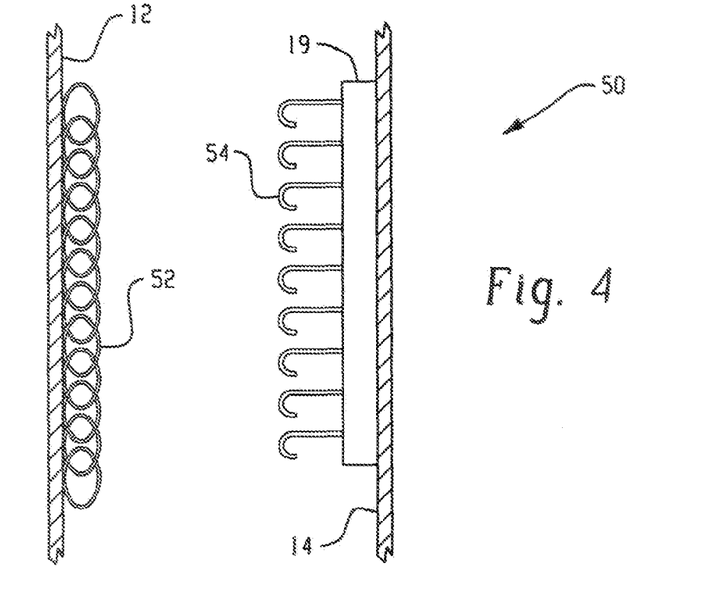
FIG. 4 illustrates a partial cross-sectional view of a door closure assist assembly in accordance with another embodiment.

FIG. 4 illustrates a door closure assist assembly, wherein the releasable fastener portion is a hook and loop fastener. The hook and loop fastener can comprises a passive mechanism of passive hooks and loops or may comprise an active hook and loop releasable fastener. Suitable active releasable fastener systems are disclosed in U.S. patent application Ser. No. 10/273,691 to Browne et al., the disclosure of which is incorporated by reference herein in their entirety. Passive hook and loop fasteners are well known in the art for various other applications.

The active releasable fastener includes a loop material 52 disposed on a selected one of the door 12 and the doorframe 14 a plurality of closely spaced upstanding hook elements 54 extending from the other one of the door and the doorframe. The hook elements 22 are formed of a material or have configurations that provide a shape changing capability and/or a change in flexural modulus properties to the hook elements 52 as will be described in greater detail. Preferably, the materials employed are resilient and flexible in addition to providing shape changing capabilities and/or changes in the flexural modulus properties. Coupled to and in operative communication with the hook elements 54 is an activation device (not shown). The activation device, on demand, provides an activation signal to the hook elements 54 to change the shape orientation and/or flexural modulus of the hook element 54. The activation signal provided by activation device for changing the shape orientation and/or flexural modulus of the hook elements 54 may include a heat signal, a magnetic signal, an electrical signal, a pneumatic signal, a mechanical activation signal, combinations comprising at least one of the foregoing signals and the like, the particular activation signal depending on the materials and/or configuration of the hook elements 54. The change in shape orientation and/or flexural modulus property generally remains for the duration of the applied activation signal. Upon discontinuation of the activation signal, the hook elements 54 revert substantially to a relaxed or unpowered shape. The illustrated releasable fastener 50 is exemplary only and is not intended to be limited to any particular shape, size, configuration, number or shape of hook elements 54, shape of loop material 52, or the like.

Upon closing the door against the frame, the two portions 52, 54 are pressed together and become engaged. In one embodiment, the hook elements have a substantially straight orientation. Upon activation or deactivation depending on the properties of the active material defining the hook elements, the hook elements change shape to a hook shape, thereby causing cinching of the door against the doorframe, i.e., provides final closure. Optionally, the hook elements and/or loop material are fixedly attached to the extender portion 19. In this manner, final door closure can occur over a greater distance by extending the loop material and/or hook elements to provide engagement. Final door closure assist can then occur upon retraction of the extender portion.

In practice, spacing between adjacent hook elements 54 as well as length is an amount effective to provide final door closure. The hook elements 54 preferably have a shape configured to become engaged with the loop material 52 upon pressing contact of the loop portion 52 and activation thereof. In this engaged mode, the hook elements 54 can have an inverted J-shaped orientation, a mushroom shape, a knob shape, a multi-tined anchor, T-shape, spirals, or any other mechanical form of a hook-like element used for separable hook and loop fasteners. Such elements are referred to herein as "hook-like", "hook-type", or "hook" elements whether or not they are in the shape of a hook. Likewise, the loop material may comprise a plurality of loops or pile, a shape complementary to the hook element (e.g., a key and lock type engagement), or any other mechanical form of a loop-like element used for separable hook and loop fasteners.

The loop material 52 generally comprises a random looped pattern or pile of a material. The loop material is often referred to as the "soft", the "fuzzy", the "pile", the "female", or the "carpet". Suitable loop materials include thermoplastics such as polypropylene, polyethylene, polyamide, polyester, polystyrene, polyvinyl chloride, acetal, acrylic, polycarbonate, polyphenylene oxide, polyurethane, polysulfone, and the like. The loop material 52 may be integrated with the support or may be attached to the support.

Alternatively, the loop material 52 can be fabricated from the same shape changing and/or modulus changing materials employed for the hook elements. As such, instead of being passive, the loop material can be made active upon receipt of an activation signal.

Of the above noted door closure assist assemblies, shape memory alloy and/or shape memory polymer based assemblies may further include a return mechanism to restore the original position of the assembly, if desired. The return mechanism can be mechanical, pneumatic, hydraulic, and/or may be based on one of the aforementioned shape memory materials.

In those applications where the shape memory materials are integrated into a seal body, the materials integrated with the active materials are preferably those materials already utilized for manufacture of seals. For example, various rubbers, foams, elastomers, and the like can be utilized in combination with the shape memory material to provide an active sealing assembly. As such, suitable seal materials are generally flexible and may include, but are not intended to be limited to, styrene butadiene rubber, polyurethanes, polyisoprene, neoprene, chlorosulfonated polystyrenes, and the like.

By utilizing the active material in the seal assembly, the seal assembly can reversibly change its modulus and/or shape properties to provide improved reversible extension of the door closure assist assembly. Applying an activation signal to the active material can effect the reversible change. Suitable activation signals will depend on the type of shape memory material utilized in the seal assembly. As such, the activation signal provided for reversibly changing the shape and/or modulus properties of the seal assembly may include a heat signal, an electrical signal, a magnetic signal, and combinations comprising at least one of the foregoing signals, and the like.

Optionally, the door closure assist assembly may include one or more sensors that are used in combination with enhanced control logic to, for example, maintain the same level of sealing force independent of environmental conditions, e.g., humidity, temperature, pressure differential between interior and environment, and the like. In other embodiments, sensors, e.g., capacitive sensors, can be employed to detect when the door is sufficiently close to the frame.

As previously discussed, suitable active materials include piezoelectric materials, shape memory alloys, shape memory polymers, ferromagnetic shape memory alloys, an electroactive polymers, a magnetorheological elastomers, dielectric elastomers, ionic polymer metal composites, or combinations comprising at least one of the foregoing materials.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Shape memory polymers (SMPs) generally refer to a group of polymeric materials that demonstrate the ability to return to some previously defined shape when subjected to an appropriate thermal stimulus. The shape memory polymer may be in the form of a solid or a foam as may be desired for some embodiments. Shape memory polymers are capable of undergoing phase transitions in which their shape orientation is altered as a function of temperature. Generally, SMPs are co-polymers comprised of at least two different units which may be described as defining different segments within the copolymer, each segment contributing differently to the flexural modulus properties and thermal transition temperatures of the material. The term "segment" refers to a block, graft, or sequence of the same or similar monomer or oligomer units that are copolymerized with a different segment to form a continuous crosslinked interpenetrating network of these segments. These segments may be combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the SMP and the thermal transitions thereof. When multiple segments are used, multiple thermal transition temperatures may be observed, wherein the thermal transition temperatures of the copolymer may be approximated as weighted averages of the thermal transition temperatures of its comprising segments. With regard to shape memory polymer foams, the structure may be open celled or close celled as desired.

In practice, the SMPs are alternated between one of at least two shape orientations such that at least one orientation will provide a size reduction relative to the other orientation(s) when an appropriate thermal signal is provided. To set a permanent shape, the shape memory polymer must be at about or above its melting point or highest transition temperature (also termed "last" transition temperature). SMP foams are shaped at this temperature by blow molding or shaped with an applied force followed by cooling to set the permanent shape. The temperature necessary to set the permanent shape is generally between about 40° C. to about 200° C. After expansion by fluid, the permanent shape is regained when the applied force is removed, and the expanded SMP is again brought to or above the highest or last transition temperature of the SMP. The Tg of the SMP can be chosen for a particular application by modifying the structure and composition of the polymer.

The temperature needed for permanent shape recovery can generally be set at any temperature between about −63° C. and about 160° C. or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

Suitable shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane block copolymers, styrene-butadienestyrene block copolymers, and the like.

Conducting polymerization of different monomer segments with a blowing agent can be used to form the shape memory polymer foam. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N'dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen gas, and the like. The material can then be reverted to the permanent shape by heating the material above its Tg but below the highest thermal transition temperature or melting point. Thus, by combining multiple soft segments it is possible to demonstrate multiple temporary shapes and with multiple hard segments it may be possible to demonstrate multiple permanent shapes.

Similar to shape memory polymers, shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory foam to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials for fabricating the foams include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition generally depends on the temperature range where the component will operate.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Advantageously, the use of the active materials as described herein eliminates the need for bulky and complicated motors, provides a lightweight solution to door cinching, reduces noise, as well as reduces the forces employed for door closure.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A door closure assist assembly for assisting in the closing of a door with respect to a doorframe, the assembly comprising:
    an extender portion attached to one of the door and the doorframe, the extender portion comprising a shape memory material;
    a releasable fastener comprising a magnet attached to the extender portion and a ferrous material attached to the other one of the door and the doorframe;
    an activation device in operative communication with the shape memory material; and
    a controller in operative communication with the activation device,
    wherein, when the door is moved toward a closed position, an energy field will be created when the magnet is proximate to the ferrous material at a first distance, the energy field will be detected, making the controller activate the activation device, the activation device will send an activation signal to the extender portion, the shape memory material will be operated to change the fundamental property of the shape memory material when exposed to the activation signal so that the extender portion is caused to linearly expand to a first position, attaching the magnet to the ferrous material, when the magnet is attached to the ferrous material at a second distance, the activation signal will be deactivate, making the shape memory material reverse the change in fundamental property and return the extender portion to its original position, providing a final closing action to the door against the doorframe.

2. The door closure assist assembly of claim 1, wherein the extender portion comprises an electroactive polymer or a dielectric elastomer.

3. The door closure assist assembly of claim 1, wherein the extender portion comprises a unimorphic or bimorphic piezoelectric material.

4. The door closure assist assembly of claim 1, further comprising a linear motion amplifier in operative communication with the extender portion.

5. The door closure assist assembly of claim 1, wherein the shape memory material comprises a piezoelectric material, a ferromagnetic shape memory alloy, a shape memory alloy, a shape memory polymer, an electroactive polymer, a dielectric elastomer, a magnetorheological elastomer, and combinations comprising at least one of the foregoing.

6. The door closure assist assembly of claim 1, wherein the extender portion is disposed within a seal body.

7. A method for assisting a final closing motion of a door within a doorframe comprising:
    providing an extender portion attached to one of the door and the doorframe, the extender portion comprising a shape memory material;
    providing a releasable fastener comprising a magnet attached to the extender portion and a ferrous material attached to the other one of the door and the doorframe;
    providing an activation device in operative communication with the releasable fastener and the shape memory material;
    providing a controller in operative communication with the activation device;
    closing the door to a first distance from the doorframe;
    sensing an energy field created between the magnet and the ferrous material;
    sending a signal to the activation device from the controller;
    sending an activation signal to the shape memory material from the activation device to change the fundamental property of the shape memory material in order to allow the extender portion to linearly extend to a position where the magnet can engage the ferrous material at a second distance from the doorframe; and
    deactivating the activation signal when the magnet is attaché to the ferrous material, making the shape memory material to reversible change the fundamental property of the shape memory material to return the extender portion to its original position, providing a final closing action to the door against the doorframe.

8. The method of claim 7, wherein the magnet comprises a permanent magnet or a electromagnet.

9. The method of claim 7, wherein the shape memory material comprises a piezoelectric material, a ferromagnetic shape memory alloy, a shape memory alloy, a shape memory polymer, an electroactive polymer, a dielectric elastomer, a magnetorheological elastomer, and combinations comprising at least one of the foregoing.

10. The method of claim 7, wherein activating the door closure assist assembly and deactivating the door closure assist assembly is repeatable.

* * * * *